United States Patent [19]

Abu-Isa

[11] Patent Number: 4,541,735
[45] Date of Patent: Sep. 17, 1985

[54] THERMAL SENSING ELEMENT USING METHANOL SATURATED FLUOROCARBON ELASTOMER AS THE HEAT RESPONSIVE MATERIAL

[75] Inventor: Ismat A. Abu-Isa, Rochester, Mich.

[73] Assignee: General Motors Corporation, Detroit, Mich.

[21] Appl. No.: 685,805

[22] Filed: Dec. 24, 1984

[51] Int. Cl.⁴ .................. G01K 5/48; H01H 37/46
[52] U.S. Cl. .................... 374/188; 60/527;
 337/393; 236/101 R; 524/546
[58] Field of Search .......... 374/187, 188, 198;
 236/99 K, 100, 101 R; 252/408.1, 962; 60/527;
 337/393, 394, 382; 285/DIG. 10; 524/379, 546

[56] References Cited

U.S. PATENT DOCUMENTS

| | | | |
|---|---|---|---|
| 2,636,776 | 4/1953 | Vernet | 60/527 |
| 2,990,716 | 7/1961 | Butts | 337/393 |
| 3,040,581 | 6/1962 | Grayson | 60/527 |
| 3,823,560 | 7/1974 | Hansen | 60/527 |
| 4,253,304 | 3/1981 | Lamb et al. | 374/187 |
| 4,421,878 | 12/1983 | Close | 524/526 |
| 4,487,878 | 12/1984 | Vasta | 524/546 |

OTHER PUBLICATIONS

"Elastomer-Gasoline Blends Interactions I. Effects of Methanol-Gasoline Mixtures on Elastomers", Ismat A. Abu-Isa, Journal of Rubber Chemistry and Technology, vol. 56, No. 1, 3-4-1983, pp. 135-168.

Primary Examiner—Steven L. Stephan
Assistant Examiner—Thomas B. Will
Attorney, Agent, or Firm—Randy W. Tung

[57] ABSTRACT

A thermal sensing element containing a heat responsive material having a very high negative coefficient of thermal expansion. The heat responsive material contained therein is a methanol saturated copolymer of hexafluoropropylene and vinylidene fluoride. This thermal sensing element can detect minute temperature changes and can be packaged in a compact container for use in applications where space is limited.

2 Claims, 4 Drawing Figures

THERMAL SENSING ELEMENT USING METHANOL SATURATED FLUOROCARBON ELASTOMER AS THE HEAT RESPONSIVE MATERIAL

FIELD OF THE INVENTION

The present invention generally relates to a heat responsive thermal sensing element and, more particularly, it is concerned with a thermal sensing element where the heat responsive material is a methanol saturated copolymer of hexafluoropropylene and vinylidene fluoride.

BACKGROUND OF THE INVENTION

Temperature control devices utilizing thermal sensing elements are commonly used in the industry, i.e., in applications where temperature of a certain environment is to be kept within a desirable range. These applications occur in a variety of media such as gases, liquids, or solids in which temperature control is desired.

One of the commonly seen applications is the temperature control of an environmental chamber. In such an application, a temperature control device is utilized where a thermal sensing element is exposed to the interior of the chamber. The thermal sensing element senses the temperature changes in the chamber and sends back either a mechanical or electrical signal to the temperature control device which in turn, either turns on or turns off the heating element in the chamber.

There are many different types of thermal sensing elements in existence today. These include the bimetallic type, where two strips of metal each of a different thermal expansion characteristic are laminated together. A temperature change causes the laminated bimetallic strip to bend toward an electrical contact thus activating the temperature control device. Another type of commonly used thermal sensing element is a tubular casing containing a thermal responsive material and a triggering element. A commonly used heat responsive material in this type of thermal sensing element is a petroleum based wax which expands or contracts according to temperature changes. A triggering device is activated by the volume change of the wax material to send out signals to the temperature control device.

A common drawback of these two types of thermal sensing elements is their limitation in temperature sensitivity. the coefficients of thermal expansion of these materials are not very high. As a result, these thermal sensing elements are not very useful when the device is to respond to a small temperature change. Another drawback in the application of these thermal sensing elements is that a relatively large volume of material must be used in order to produce the necessary volume change in them to trigger the temperature control device. This leads to rather bulky thermal sensing elements which may not be practical for applications where space is limited.

It is therefore an object of the present invention to provide a thermal sensing element containing a heat responsive material having a very high negative coefficient of thermal expansion.

It is yet another object of the present invention to provide a thermal sensing element containing an elastomeric heat responsive material that is sensitive enough to detect minute temperature changes.

It is a further object of the present invention to provide a thermal sensing element containing a heat responsive elastomeric material that shrinks appreciably with relatively small temperature increases and can also be packaged in a compact container for use in applications where space is limited.

SUMMARY OF THE INVENTION

The present invention provides a thermal sensing element containing a heat responsive material having an extremely high coefficient of thermal expansion. This new device overcomes the problems of the existing elements and satisfies the need of the industry for a compact element. The novelty of this new thermal sensing element lies in the material used for sensing temperature change, i.e., a copolymer of hexafluoropropylene and vinylidene fluoride saturated with methyl alcohol. This copolymer is commonly known as fluorocarbon elastomer. This methanol saturated copolymer system has a far superior sensitivity to temperature changes when compared with those conventional materials used in such applications. For instance, the coefficient of thermal expansion of a methanol saturated copolymer of hexafluoropropylene and vinylidene fluoride is more than 100 times larger than that of copper. It is also significantly higher than the coefficient of thermal expansion of petroleum based wax, another commonly used material. As a result of this extremely high coefficient of thermal expansion, the volume of the heat responsive material required to respond to a certain temperature change is significantly reduced. This enables a thermal sensing element to be constructed in a compact size.

In accordance with a preferred practice of my invention, a thermal sensing element containing a heat responsive expandible material of a copolymer of hexafluoropropylene and vinylidene fluoride saturated with methanol can be constructed by the following operative steps:

A body of fluorocarbon elastomer is first saturated with methanol by soaking the elastomer in methanol for a sufficient length of time. This swollen network of copolymers is then inserted into a tubular casing having a closed end and open end and pushed into contact with the closed end. An electrode is attached to the upper surface of the swollen copolymer and connected to an insulated wire leading to the outside of the tubular casing. A second electrode is placed at a distance from the first electrode and attached to an adjustable means going through a seal member such that the distance between the two electrodes may be preferentially set. A second insulated wire is connected to this second electrode through the seal member. A seal member made of a material that is inert to methanol is employed to plug the open end of the tubular casing encasing the wire. The seal member encasing both the adjustable means and the insulated wires provides a hermetic seal between the inside of the tubular casing and the atmosphere so that methanol can not escape from the tubular casing. A thermal sensing element having significantly improved sensitivity for measuring temperature changes is thus constructed.

A micrometer head may optionally be used as the means for adjustment of the second electrode. It is commercially available and provides accurate control of the preset distance between the two electrodes. By accurately setting this distance, any minute temperature changes can be detected by this novel thermal sensing element.

DESCRIPTION OF THE DRAWINGS

Other objects, features and advantages of the present invention will become apparent upon consideration of the specification and the appended drawings, in which.

DESCRIPTION OF THE PREFERRED EMBODIMENT

One of the limitations in using existing thermal sensing elements is the relatively low coefficient of thermal expansion of the heat responsive materials used in such elements. Because of such low coefficient of thermal expansion, a relatively large volume of such material is required to sense a temperature change. This often leads to the problem in practical applications where a bulky temperature sensing element is constructed which cannot be fitted into a limited space. In other instances, an expandable material exhibits a large coefficient of thermal expansion, but only in a very narrow temperature range. For example, a refined paraffin wax exhibits a large coefficient of thermal expansion of $1.0-1.6 \times 10^{-3}$, but only in a narrow temperature range of approximately 20° below its melting point of 165° F. Therefore, its utilization as a temperature sensing element material is very limited.

My novel invention is a thermal sensing element utilizing a unique heat responsive expandable material of a copolymer of hexafluoropropylene and vinylidene fluoride saturated with methanol. I have discovered that the coefficient of thermal expansion of this methanol swollen fluorocarbon elastomer system is approximately 100 times larger than that of copper. For instance, the coefficient of linear thermal expansion of methanol swollen fluorocarbon elastomer is $-1.92 \times 10^{-3}$/°C. in the temperature range of $-40°$ to $0°$ C., and $-3.13 \times 10^{-3}$/°C. in the temperature range of 0° to 60° C. This is compared to the coefficient of thermal expansion of copper at 25° C. of $1.66 \times 10^{-5}$/°C. This amazingly high sensitivity of the swollen elastomer to temperature can be utilized to construct very sensitive temperature sensing elements to detect minute temperature changes. It can be used in a wide temperature range between $-40°$ C. to 60° C., much broader than any other available heat responsive material.

Figure 1:
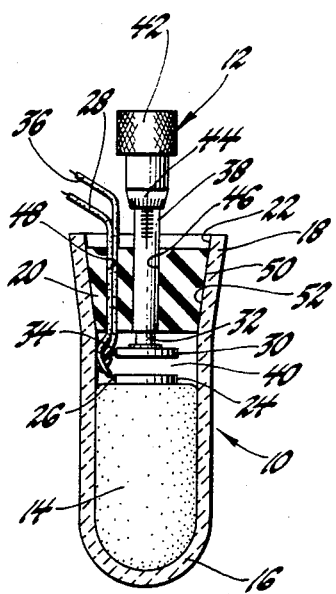
FIG. 1 is an assembled thermal sensing element equipped with a micrometer head.

Referring initially to FIG. 1, an assembled heat sensing element 10 is shown equipped with a micrometer head 12. A volume of swollen elastomer 14 is positioned at the bottom 16 of the tubular casing 18. A seal member 20 is positioned inside the tubular casing 18 near the open end 22. A first electrode 24 is attached to the upper surface of the swollen elastomer material and connected at 26 to an insulated wire 28. A second electrode 30 is attached to the tip of the spindle 32 of the micrometer head 12. It is connected at 34 to a second insulated wire 36. The seal member 20 encasing wires 28 and 36 and the spindle sleeve 38 of the micrometer head 12 provide a hermetic seal between the interior of the tubular casing 40 and the atmosphere to prevent the loss of methanol. The distance l between the two electrodes can be accurately set by turning the thimble 42 on the micrometer head 12 according to the vernier reading 44.

The swollen elastomer system can be prepared by the following steps:

First, a fluorocarbon elastomer is compounded by following the formula set out in Table 1.

TABLE 1

| Ingredients | Concentrations, phr |
|---|---|
| Viton AHV | 100 |
| Maglite D | 15 |
| Diak #1 | 1.5 |
| N990 black | 25 |

The ingredients listed in Table 1 can be obtained from the following sources:

Viton AHV is a copolymer of hexafluoropropylene and vinylidene fluoride which can be obtained from E. I. DuPont Co. Maglite D is a magnesium oxide which can be obtained from C. P. Hall Co., Merek Chemical Division. Diak #1 is hexamethylene diamine carbamate which can be obtained from E. I. DuPont Co. N990 black is a carbon black which is readily available from J. M. Huber Corporation.

The rubber is compounded according to Table 1 in a standard laboratory rubber mill for approximately 10 minutes. The rubber compound is then compression molded into a cylindrical shaped rod in a heated press. The molding conditions are 30 minutes at 163° C. followed by post-curing for 24 hours at 205° C. After the elastomer is fully cured, it is soaked in methyl alcohol in a test tube for 72 hours at room temperature. This period of time was found to be sufficient for the elastomer to reach equilibrium swell. The percent volume swell after 72 hours room temperature immersion in methanol was found to be 100% for the fluorocarbon elastomer. In other words, the room temperature volume of the methanol saturated elastomer body was twice that of the unsoaked as-molded body. A short length of this swollen elastomer is then placed in a tubular casing to fill the bottom of the casing. The open end of the tubular casing is immediately sealed to prevent the loss of methanol from the swollen elastomer.

The tubular casing can be made of either a metal or a plastic material. Metal is generally preferred because of its high thermal conductivity. However, a plastic material such as high density polyethylene may be filled with mineral fillers to increase its thermal conductivity and then injection molded at very low cost.

The seal member 20 in FIG. 1 is made of one of several elastomers which have high resistance to swelling and permeation by methanol. My investigation showed that these elastomers and their respective percent volume swell after 72 hours room temperature immersion in methanol are as follows: ethylene-propylene-diene elastomer (EPDM) 0%, natural rubber 1%, styrene-butadiene rubber 0%, and silicone rubber 1%. The seal member 20 is compression molded into the shape of a rubber stopper commonly used in laboratories. A hole 46 is drilled in the center of the seal member 20 to allow a tight compression fit with the spindle sleeve 38 of the micrometer head 12 (FIG. 1). It is recommended that the center hole 46 should be drilled slightly smaller than the outside diameter of the spindle sleeve 38 to insure a tight seal against loss of methanol. Another small hole 48 is drilled on the side of the seal member 20 to allow wires 28 and 36 to go through while providing a tight seal against loss of methanol. A tight compression seal is formed between the outer peripheral surface 50 of the seal member 20 and the inner surface 52 of the tubular casing 18 providing a hermetic seal.

I have found that a suitable means for accurate adjustment of the distance 1 between the electrodes (FIG. 1) is the use of a micrometer head with non-rotating spindles. One of such micrometer heads is found in the popular McMaster Carr catalog listed as part number 8578 A-12. This micrometer head provides a full range adjustment of 1" with a graduation of 0.001". This micrometer head is ideal for this application because when the thimble is turned, the spindle travels along its axis but does not rotate.

Figure 2:
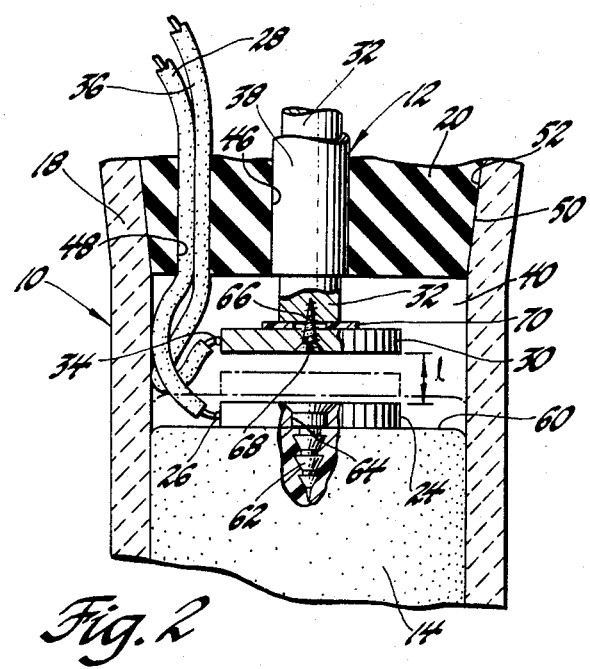
FIG. 2 is an enlarged sectional view showing the details of the electrodes.

A detailed illustration of the electrodes is shown in FIG. 2. The first electrode 24 is attached to the upper surface 60 of the swollen elastomer 14 by a press-in type fastener 62 through a hole 64 located in the center of the first electrode 24. The second electrode 30 is attached to spindle 32 of the micrometer head 12 by using a plastic screw 66 through a center hole 68 in the second electrode 30. A non-electrical conducting washer member 70 made of a non-methanol sensitive plastic or rubber is placed in between the second electrode 30 and spindle 32 of the micrometer head 12 to provide insulation.

Figure 3:
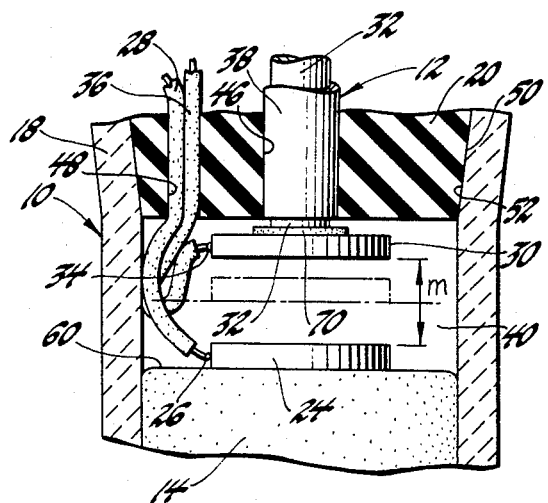
FIG. 3 is a view like FIG. 2, except the micrometer head is adjusted to a higher position to sense a larger temperature difference.

FIG. 3 shows another enlarged sectional view of the electrodes where the second electrode is adjusted further away from the first electrode providing a distance of m instead of l (FIG. 2) thereby detecting a larger temperature change. In practical applications, the electrode wires 28 and 36 are connected to a relay in a temperature control circuit. For instance, in a normally open contact relay, a temperature drop will cause the elastomer 14 to expand because of its negative coefficient of thermal expansion and closes the gap l (FIG. 1) providing a closed circuit between 28 and 36. This in turn sends a current to energize a coil which turns on a switch to provide heat to the system so that the desirable temperature can be restored.

Figure 4:
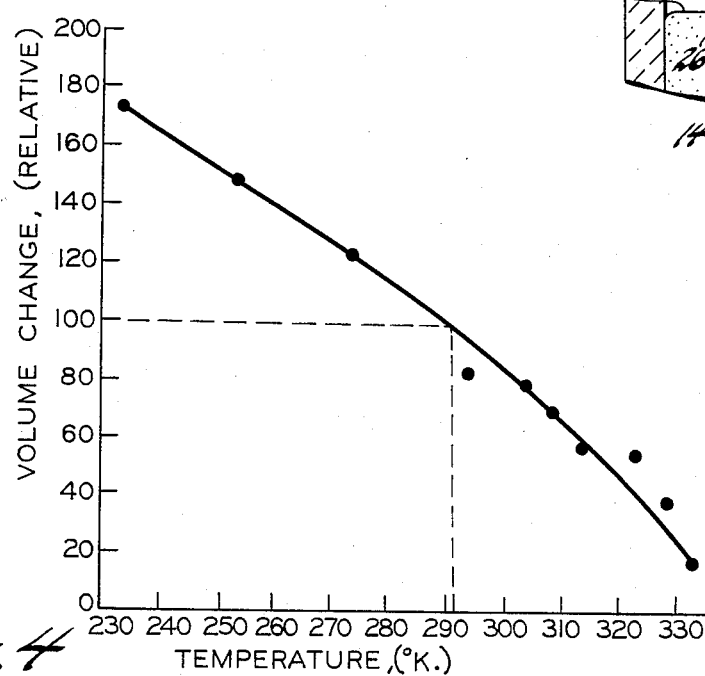
FIG. 4 is a graph showing the relative volume change of the swollen copolymer system when compared to a volume of 100 for a swollen copolymer system at 293° k.

A compact size thermal sensing element can be constructed utilizing this swollen fluorocarbon elastomer as the heat responsive material to detect minute temperature changes. The size of this compact thermal sensing element is much smaller than the conventional thermal sensing element utilizing wax as its expandible material. A relative volume change of this methanol swollen fluorocarbon elastomer at various temperatures is shown in FIG. 4. The high coefficient of thermal expansion together with the wide temperature range of this heat responsive material can be utilized make this thermal sensing element extremely useful in temperature control devices.

While my invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. An improved heat responsive thermal element of the type having a first and second electrode and a volume of heat responsive material acting in combination with said electrodes to permit the flow of electricity between them when a predetermined temperature change has produced a predetermined volume change in said material, wherein the improvement comprises a heat responsive material of methanol saturated copolymer of hexafluoropropylene and vinylidene fluoride.

2. A thermal sensing element comprising,
   a tubular casing having a closed end and an open end,
   a body of a heat responsive material positioned in said casing extending from the closed end toward the open end partially filling the casing, said body of material being a methanol saturated copolymer of hexafluoropropylene and vinylidene fluoride having an upper surface,
   a first electrode carried by the upper surface of said body of expandable material,
   a second electrode spaced from the first electrode,
   means for adjusting the second electrode to a predetermined distance from said first electrode,
   a seal member encasing said adjustable means and insulated electrical leads connected to said first and second electrodes positioned in said casing near the open end providing a hermetic seal such that the methanol content of said heat responsive material can not escape to the atmosphere, whereby said heat responsive material acts in combination with said electrodes to permit the flow of electricity between them when a predetermined temperature change has produced a predetermined volume change in said material.

* * * * *